Sept. 15, 1964   B. W. HARITONOFF   3,148,460
DEVICE FOR GRADING TEST PAPERS
Filed March 4, 1963   2 Sheets-Sheet 1

INVENTOR.
BORIS W. HARITONOFF
BY
ATTORNEY

Sept. 15, 1964  B. W. HARITONOFF  3,148,460
DEVICE FOR GRADING TEST PAPERS
Filed March 4, 1963  2 Sheets-Sheet 2
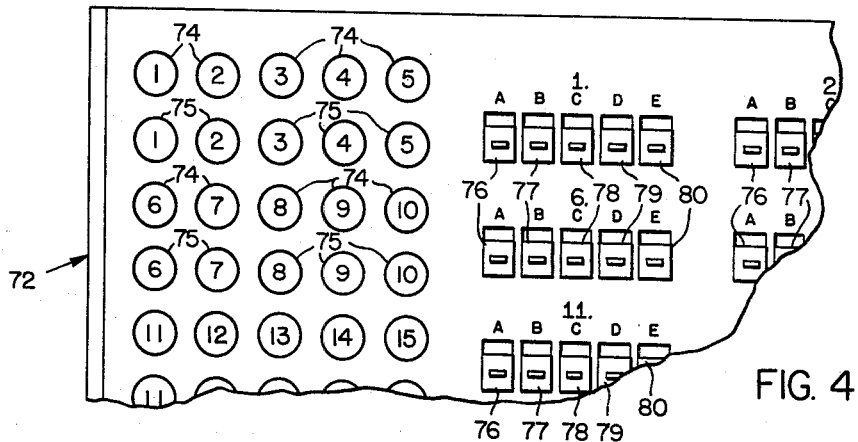
FIG. 4
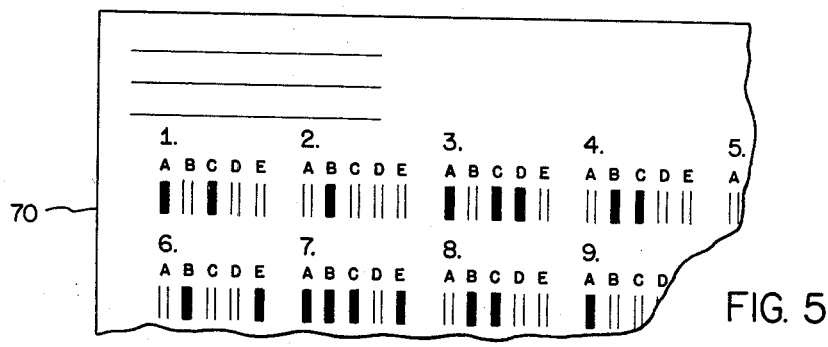
FIG. 5
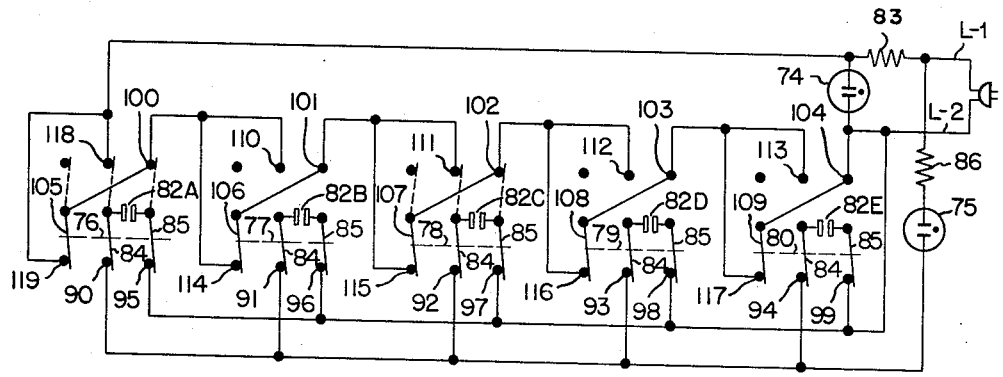
FIG. 6
INVENTOR.
BORIS W. HARITONOFF
BY 
ATTORNEY

United States Patent Office 3,148,460
Patented Sept. 15, 1964

3,148,460
DEVICE FOR GRADING TEST PAPERS
Boris W. Haritonoff, Geneseo, N.Y., assignor to Electro-Networks, Inc., Caledonia, N.Y., a corporation of New York
Filed Mar. 4, 1963, Ser. No. 262,599
4 Claims. (Cl. 35—48)

This invention relates to electrical apparatus for grading test papers and the like of the type wherein selected answers to a series of questions are indicated by marking specified areas of the paper with an electrically conductive material. More particularly, the invention relates to apparatus for use in checking test papers to ascertain the correctness of answers to a series of questions where a multiple choice of answers to each question is given. In a still more specific aspect the present invention constitutes an improvement in the apparatus described and claimed in my copending application for patent, Serial No. 173,764, filed February 16, 1962, entitled "Device for Grading Test Papers."

With the heavy load today on teachers, or other persons who are required to grade examination papers, it has become customary in devising test papers to give the pupil, or other person being examined, a choice of several different answers to each question; and all that the examinee has to do is to mark on the test paper what he believes the correct answer or answers to each question is or are.

The apparatus of my prior application mentioned is intended to be used in grading test papers where as many spaces are provided on the answer paper as there are possible answers to each question, and the examinee indicates by pencilling in the space or spaces corresponding to the selected answer or answers for the several questions of the test. The apparatus comprises a plurality of switches or groups of switches, equal in number to the number of questions on the test paper and there is a signal light for each switch or group of switches. To use the machine, the examiner adjusts each switch to a position determined by the correct answer to the question corresponding to that switch. The pencil markings are electrically conductive; and, after setting all the switches, all that the examiner needs do is to feed one test paper at a time into the machine. When a pencil marking is in the correct position, indicating a correct answer it will close a circuit and an indication will be given accordingly. If an incorrect answer is given a different indication will be given. Thus, by a quick glance at the indicators the examiner can check the answers to all of the questions of a test paper almost instantaneously.

In some instances, however, an examinee may mark on the test paper the space corresponding to a wrong answer to a question as well as the space corresponding to a correct answer to that question; and in some instances in an effort to get a passing grade an examinee may pencil in all the spaces corresponding to a given question, knowing that one of the spaces must be the correct space to mark and theorizing that, if he marks them all, he is bound to be given credit for a correct answer to the question. In my prior application one way of preventing this is provided.

One important object of the present invention is to provide improved apparatus for grading answer papers, in which the presence of an undesired, or wrong answer selection is positively indicated under all conditions regardless of whether or not the correct answer selection is also present.

Another object is to provide apparatus of this type including means for grading multiple choice questions where more than one answer selection may be required to constitute a complete answer for a particular question, including means for producing a positive indication of the presence of all the desired, or correct answer selections, and means for positively indicating the presence of an undesired, or incorrect answer selection.

Another object of the invention is to provide apparatus of the type described for grading test papers on which a single or a multiple choice of answers to each question is or are given, where means is provided for indicating whether or not all the answers are correct and complete and whether any incorrect answers are indicated on the paper.

The foregoing and other objects and advantages of the invention will become apparent from the following detailed description of representative embodiments thereof, when read in conjunction with the accompanying drawings, and the recital of the appended claims.

In the drawings:

FIG. 4 is a fragmentary plan view of the control and indicator panel of apparatus built according to a second embodiment of the invention;

FIG. 5 is a fragmentary plan view of a typical test paper showing an exemplary pattern of answer selections in which plural answer selections are desired; and FIG. 6 is a schematic circuit diagram of one section of the electrical circuit of the apparatus of the second embodiment of the invention.

The present invention provides apparatus of the stated type by means of which the presence of a wrong answer selection is positively indicated regardless of whether or not the desired, or correct, answer is selected on the answer sheet. In the first illustrated embodiment of the present invention, which is arranged for grading papers wherein only a single answer selection is desired for each question or proposition circuit means are provided to cause the indicating lamp for each question to glow at above-normal brightness in response to the marking on the test paper of an undesired, or incorrect answer for a particular question.

In the second embodiment of the present invention two indicators are provided for each question, one for indicating the presence of the correct answer selections, and the other for indicating the presence of a wrong answer selection. The circuit arrangement is designed to avoid possible ambiguities, thereby to insure actuation of the wrong answer indicator whenever a wrong answer selection is present, whether or not the correct answer selections are present, and regardless of the combination of answer selections required to constitute a complete correct answer. The electrical circuit in this embodiment of the invention includes a three pole-double throw switch for each answer selection, and the switches for each question are interconnected to actuate a first indicator to a de-energized condition only when all of the desired, or correct answer selections are present on the answer sheet, and to actuate a second indicator to an energized condition in response to the presence of an undesired, or wrong, answer selection.

Figure 1:
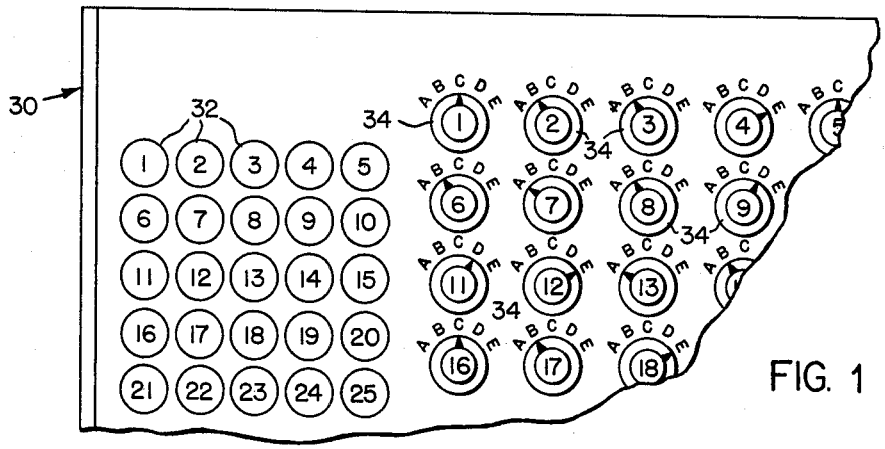
FIG. 1 is a fragmentary plan view of the control and indicator panel of apparatus built according to a first embodiment of the invention.
Figure 2:
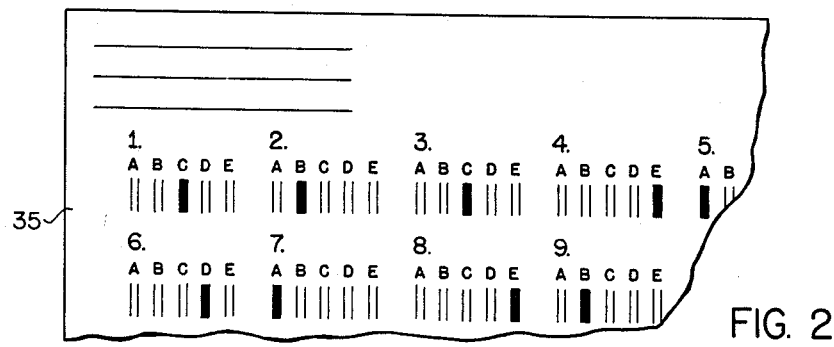
FIG. 2 is a fragmentary plan view of a typical test paper of the type for which the apparatus illustrated in FIGS. 1 and 3 is intended, showing an exemplary pattern of answer selections.

Referring now to the drawings, FIG. 1 shows a portion of the console panel 30 of apparatus constructed according to a first embodiment of the invention for grading test answer papers, such as shown fragmentarily at 35 in FIG. 2. The fragment of paper shown has space for answering nine test questions, with a selection of five possible answers for each question. The numerals 1, 2, 3, etc. on the paper 35 correspond to the numbers of the questions on the test paper. The letters "A," "B," "C," "D," and "E" under each of the numerals 1, 2, 3, etc. correspond to the five possible choices from which the pupil may select what he or she considers the correct answer to a particular question. Each letter denotes a space bounded by parallel lines. The examinee having chosen the answer which he or she thinks is correct for a particular question, fills in with conductive marking material, such as a pencil, the space or spaces under the indicia, "A," "B," etc. corresponding to the selected answer or answers for that particular question. Thus, in FIG. 2, the paper 35 shown has the third choice "C" selected as the proper answer to question 1, the space under indicium "C" being filled in; and the second choice "B" selected as the proper answer to question 2, etc.

As shown, the apparatus includes an array of annunciators, such as neon lamps 32, there being one lamp 32 for each question to be answered on the test paper. Preferably, the annunciators are numbered correspondingly to the question designations, as shown, 1, 2, 3, etc. Also mounted on the console panel 30 are a plurality of switches 34, there being at least one switch 34 for each question on the test sheet. The switches 34 are rotary multi-position switches. The several switches are numbered 1, 2, 3, etc. in correspondence with the numbers of the questions on the test; and each has a separate position for each possible answer selection to the questions. Thus, for use with an answer sheet 35 such as shown, where there are five possible answer selections A, B, C, D, or E for each question, each of the switches 34 has five different angular positions lettered A through E, respectively, so that the switch may be rotatably adjusted by the person doing the grading to a position corresponding to the desired, or correct answer selection.

Each switch 34 comprises two banks or decks; and each bank or deck in the instance shown, as will be described further hereinafter, comprises five fixed terminals and a movable contact which is rotatably adjustable manually relative to the fixed terminals of the bank or deck. The two movable contacts are connected to be rotatably adjustable together.

The apparatus also includes an array of electrical probes, or contact terminals 38 and 40 (shown schematically in FIG. 3) arranged in pairs, there being as many pairs of probes or terminals associated with each switch 34 as there are angular positions of adjustment for that switch. Thus, in the instance illustrated there are five pairs of terminals provided for each switch 34, corresponding to the number of possible answers for each test question. The terminal 38 of each pair is spaced from the terminal 40 of that pair; and each pair of probes or terminals is positioned to contact one answer space A or B or C, etc. of paper 35 when the answer sheet 35 is placed in registry against the array, so that should there be an electrically conductive marking material in the answer space, that material will form an electrical connection between the two probes 38 and 40 that contact the ends of that space.

Figure 3:
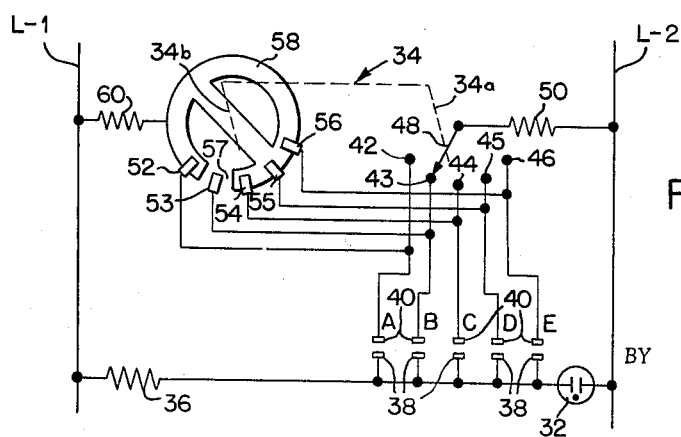
FIG. 3 is a schematic circuit diagram illustrating that portion of the electrical circuit of the apparatus of the first embodiment of the invention associated with any one question to be graded.

Each one of the multi-position switches 34, and each of the corresponding lamps 32 are connected in an individual question circuit as illustrated in FIG. 3. The lamp 32 for indicating the response to each question is connected across the main power lines $L_1$ and $L_2$ in series with a limiting resistor 36. One contact terminal, or probe 38 of each of the pairs 38, 40 associated with each switch 34 is connected between the lamp 32 and the resistor 36 to the common line. The opposite probe 40 of each pair is connected separately to the respective fixed terminals 42, 43, 44, 45, and 46 of the first bank, or deck 34a of the switch and also to the respective fixed terminals 52, 53, 54, 55, and 56 of the second bank or deck 34b of the switch. The movable contact 48 of the first deck 34a of the switch is connected through a second resistor 50 to the terminal of the lamp 32 opposite from the terminal to which the probes 38 are connected.

The movable contact or rotor 58 in the second deck 34b of each switch is in the form of a broken ring, and is mounted on a common shaft with contact 48 of the first deck so as to move synchronously with the contact 48 and to engage simultaneously all of the fixed contacts 52 to 56 in the second deck 34b except one. At any time this one is the contact that is connected to the contact 42, 43, 44, 45 or 46 with which the movable contact 48 in the first deck is engaged. The gap 57 in the rotor 58 registers at that time with that one contact, and hence that contact (53 in the instance illustrated) is not at that time in engagement with the rotor. The movable contact or rotor 58 is connected through a third resistor 60 to the side $L_1$ of the line opposite from the side $L_2$ to which the lamp 32 is directly connected.

The values of the resistors 36, 50, and 60 are chosen in view of the operating characteristics of the lamp 32 to cause operation of the lamp in accordance with the following description.

Prior to using the apparatus to grade papers, the examiner sets the switch arms 48 of the several switches 34 to positions corresponding to the numbering of the correct answers on the answer paper. Thus in FIG. 1 switch 1 is set to position "C," indicating that the third choice is the correct answer to the first question on the test paper; and switch 2 is set to position B, indicating that the second choice is the correct answer to the second question on the test paper, etc.

In operation, each lamp 32 is normally energized by current flowing through the first limiting resistor 36. In the event that an electrical connection is made between one pair of the probes 38 and 40 by conductive marking in the space on the answer sheet, which is in registry with that pair of probes, the state of energization of the lamp will change in accordance with the setting of the switch 34. If the switch 34 is set so that the upper deck movable contact 48 is connected to the upper probe 40 of the pair between which electrical connection is made, the second resistor 50 will be connected in parallel with the lamp 32, and the energization of the lamp 32 will decrease, due to the division of voltage between the limiting resistor 36 and the second resistor 50, sufficiently to extinguish the lamp. If there is or are a conductive marking or markings in another space or other spaces of the answer sheet, in addition to the marking in the correct space for the answer to a given question, the other marking or markings will be connected, respectively, to one or more of the probe pairs that are connected to the movable contact 58 of the second deck 34b of the switch. The third resistor 60 will then be connected in parallel with the limiting resistor 36 and the voltage across the lamp 32 will increase causing the lamp to glow at above-normal brightness, thus indicating a wrong answer to the question. Still further, if the spaces on the answer sheet are so marked that there is a conductive marking connecting the probes or terminals that are connected to the movable contact 48 and there is a conductive marking connecting the probes or terminals that are connected to the movable contact 58, that is, if the spaces corresponding to both the correct and the wrong answers to a given question are marked on the answer sheet, the lamp 32 will also glow at the above-normal brightness.

In grading papers, an answer sheet at a time is fed into the console, in the same manner as described in my pending application above mentioned, so that the spaces on the answer sheet for each question will register with the probe terminals 38 and 40 for the several questions. If the answer selections on a particular sheet are all correct, and there are no incorrect answer selections present, all of the indicator lights 32 on the panel 30 will go out. If there are any incorrect answer selections on the answer sheet, the corresponding indicator lights 32 will glow at above-normal brightness, regardless of whether or not the correct answers have also been selected for the partticular questions. Thus, at a glance the examiner can grade the particular answer paper. By feeding different answer papers successively into the machine, the examiner can quickly grade all the paper suubmitted in a given test.

The hereinabove-described circuit is designed for grading answer papers in which a single answer selection constitutes a complete, correct answer for each question. There are many instances, however, where it is desired to grade papers in which more than one answer selection may be required in order to make a complete, correct answer for each question, as illustratively shown on the answer sheet 70 in FIG. 5. The apparatus shown in FIGS. 4 and 6 is designed for grading papers of this type. It includes a console 72 having two indicator lamps 74 and 75, respectively, for each question. A row of double throw-three pole switches 76, 77, 78, 79, and 80 is also mounted on the console for each question to be answered, there being a separate switch 76 to 80 for each possible answer selection. The switches are individually adjusted to one position if a particular answer selection is desired, that is, is correct, and to the opposite position if the particular answer selection is undesired, or wrong.

The switches 76 to 80 and the lamps 74 and 75 for each question are connected in a circuit as shown in FIG. 6 so that when the answer paper is inserted in the machine, and pressed into register with the contact terminals, or probes 82A to 82E, the first lamp 74 for each question will be shifted from a normally energized to a deenergized condition only if all of the desired, or correct answer selections for that particular question have been marked on the answer paper; whereas the second lamp 75 for that particular question will change from a normally deenergized to an energized condition if any one or more of the undesired, or wrong answer selections for the particular question have been marked on the answer paper regardless of whether a correct answer or answers for that question have been marked also.

In the circuit corresponding to each question, the first lamp 74 may be called the CORRECT lamp, because, when it changes from a normally energized to a deenergized condition, it indicates that all of the one or more desired answer selections for the corresponding question have been marked on the answer paper. The CORRECT lamp 74 is connected across the power line $L_1$ and $L_2$ in series with a current limiting resistor 83. The switches 76 to 80 for a particular question are connected with each other and with the associated probes 82A to 82E in parallel with the associated lamp 74 so that that lamp 74 is shorted out when, and only when, all of the correct answer selections for the corresponding question are marked on the answer sheet in the machine.

The second lamp 75 corresponding to each question is intended to indicate the presence of an undesired or wrong answer, and is normally off. It may be called the WRONG lamp. It is conected across the lines $L_1$ and $L_2$ to be in series with a limiting resistor 86, the switches 76 to 80, and the probes 82A to 82E when its energizing circuit is completed by marking one or more possible answer selections for the corresponding question wrongly on the answer paper.

When the machine is not in use but is plugged in ready for use, and the switches are in their down positions the lamps 74 and 75 will be deenergized, or off. In this circuit, the switches 76–80 are connected in a series arrangement. The two probes of the respective probe pairs 82A to 82E are connected with the center and right-hand movable contacts 84 and 85, respectively, of the respective switches 76 to 80 so that when the probes of any pair are electrically connected to each other, they effect an electrical connection between the center and right-hand movable blades or contacts 84, 85 of the corresponding switch. The lower center fixed contacts 90, 91, 92, 93, and 94 of all the switches 76 to 80 are connected together and to the WRONG lamp 75. The lower right-hand fixed contacts 95, 96, 97, 98, and 99 of all the switches are connected together and to the main line $L_2$ which connects with one terminal of the CORRECT lamp 74. The upper right-hand fixed contacts 100, 101, 102, 103, and 104 of each switch are connected to the left-hand movable blades 105, 106, 107, 108, and 109 of the respective switches. In the four switches 76, 77, 78, and 79 on the left in the diagram, the upper right hand fixed contact 100, 101, 102, and 103, respectively, of each switch is also connected to the upper center fixed contact 110, 111, 112, and 113, respectively, and to the lower left-hand fixed contact 114, 115, 116, and 117, respectively, of the next adjacent switch to the right. The upper right-hand fixed contact 104 of the switch 80 on the extreme right is connected to the main line $L_2$ and to that one terminal of the CORRECT lamp 74 to which the lower right-hand fixed contacts 95, 96, 97, 98, 99 of the switches are connected. In the switch 76 at the extreme left the upper center fixed contact 118 and the lower left hand fixed contact 119 are connected together and to the opposite terminal of the lamp 74. The circuit for shorting the CORRECT lamp 74 may be traced from one terminal of the lamp through the upper right hand fixed contact 104 of the right-hand switch 80, the movable blade or contact 109 of that switch, the fixed contact 117, the upper right-hand fixed contact 103 of the next switch 79, the movable blade or contact 108 and the lower left-hand fixed contact 116 of switch 79, the fixed contact 102 and the movable blade or contact 107 and the fixed contact 115 of the switch 78, the upper right hand fixed contact 101 and the movable blade or contact 106 and the lower left-hand fixed contact 114 of second switch 77, the upper right hand fixed contact 100 and the movable blade or contact 105 and the lower left hand fixed contact 119 of first switch 76, and back to the other terminal of the lamp.

The circuit for energizing the WRONG lamp 75 is open unless a connection is made across one of the probe pairs 82A to 82E.

For use, the person grading the answer paper adjusts the switches which correspond to the correct answer selections for each question of the test paper to their up positions. The other switches, which correspond to the wrong answer selections are left in their down positions. The circuit for shorting each CORRECT lamp 74 will then extend across the probe pairs that are connected to the switches that have been moved to the up positions, and the shorting circuit will not be completed until those probe pairs are connected electrically by the electrically conductive material on the answer paper. The CORRECT lamp 74 will, therefore, remain energized if the student has failed to mark any desired, or correct answer selection. An undesired anwer selection will connect the probes of a pair connected to one of the switches 76–80 that is in a down position, thereby completing the energizing circuit for the WRONG lamp 75.

For example, assume that to answer correctly and completely the first question on the test paper, the first and third choices of answers, which are given on the test paper, should be selected. Then the person grading the answer papers sets the left hand and the middle switches 76 and 78, respectively, which correspond to the first question on the test paper, to their up positions so that their blades 105, 84, 85 and 107, 84 and 85, respectively, are in their upper positions, as indicated by the dashed lines in the schematic diagram of FIG. 6. The other three switches 77, 79, and 80, which are in the group corresponding to this first question on the test paper, are left in their down positions. If the student makes the proper selection of answers to the first question and marks his paper correctly and completely for the answer to the first question, then, he will mark the spaces A and C under answer 1 as shown in FIG. 5. When the answer paper is fed into position in the machine, then, the conductive markings on the paper under "A" and "C" of answer 1 will bridge the probes or terminals 82A and 82C of switches 76 and 78 for question 1; and a circuit will then be made from the line L-2 through the upper right-hand fixed contact 104 of the right-hand switch 80, the left-hand movable blade or contact 109 of this switch, the lower left-hand fixed contact 117, the upper right-hand fixed contact 103 of the next switch 79, the left-hand movable blade or contact 108 of this switch, the lower left-hand fixed contact 116, the upper right-hand fixed contact 102 of the next switch 78, the movable contact or blade 85 of this switch which is now in its upper, dash-line position, the probe pair 82C, which are connected together electrically by the electrically conductive material at "C" on the answer paper, the center movable blade or contact 84 of the switch 78 which is also now in its upper, dash-line position, the upper center fixed contact 111, the upper right-hand fixed contact 101 of the next switch 77, the left-hand movable contact or blade 106 of this switch, its lower left-hand fixed contact 114 of this switch, the upper right-hand fixed contact 100 of the first switch 76, the right-hand movable blade or contact 85 of this switch which is now in its upper, dash-line position, the probe pair 82A, which are electrically connected to each other by the electrically conductive material at "A" on the answer paper, the center movable contact or blade 84 of switch 76 which is now in its upper, dash-line position, the upper center fixed contact 118 of this switch, and then back to the lamp 74. This circuit will short out the CORRECT lamp 74. This lamp will be shorted out, however, only if both of the probe pairs 82A and 82C are connected by the electrically conductive material on the answer paper, that is, only if the examinee has indicated on the answer paper correct and complete answers for question 1. The shorting circuit will not be completed, though, if the conductive material is missing from either of the spaces contacted by the respective probe pairs 82A and 82C.

Now, if the student has selected one of the undesired, that is, wrong, answers B, D, or E, for the particular question and has marked the answer paper accordingly, there will be electrically conductive material on the answer paper connecting the corresponding probe pair 82B, 82D, or 82E, and an energizing circuit will be completed through that probe pair and through the center and right-hand movable contacts or blades 84, 85 of the corresponding switch 77, 79, or 80 to the lower center and right-hand fixed contacts 91 and 96, 93 and 98, or 94 and 99, respectively, of that particular switch to energize the WRONG lamp 75, thereby indicating the selection of an undesired, or wrong answer.

The circuit is relatively simple and symmetrical. Any desired number of answer selections may be required, of the student to make a complete correct answer, and the CORRECT lamp 74 will be extinguished only if all of the required answer selections are present, because the circuit for shorting the lamp is made in series through all of the probe pairs that are connected to the switches that are in the up position. Also, the energizing circuit for the WRONG lamp 75 is completed by an electrical connection between any pair of probes that is connected to a switch in the down position.

The terms "up," "down," "first," "second," "third," "left-hand," "right-hand," and so on are used hereinabove solely in reference to the schematic diagram in FIG. 6, and are not to be construed as referring to the actual locations of the switches, the parts thereof and their physical positions in an actual embodiment of the invention.

From the above it wil be seen that the CORRECT lamp for each question will only be shorted out if the complete and correct answers are given to the question. If more than one answer to a particular question is called for in order to answer the question completely, and the examinee marks less than the number of answers required to answer the question completely, the shorting circuit will not be completed; and the light 74 corresponding to the question will remain on. If a wrong answer is given in one embodiment the lamp will remain on and will burn at higher intensity than when the machine is merely in position for use. In the other embodiment if the answer is incomplete and there is also a wrong answer both the CORRECT and the WRONG lamp will be on. From the preceding description it will be seen then that at a glance the examiner can check the answers to all the questions on an answer paper, and can thereby determine what questions the examinee has answered rightly and fully, and what questions he or she has answered wrongly.

While the invention has been described in connection with two specific embodiments thereof, it will be understood that it is capable of further modification, and this application in intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A machine for grading the answer paper to a test wherein there are a multiple choice of answers to each test question, and the chosen answers are indicated by marking selected areas of the answer paper with electrically conductive material, said machine comprising, for each question to be graded:

(a) an electrically-operated indicating device,
   (b) a plurality of pairs of spaced probes,
   (c) switch means comprising a plurality of movable contacts connected to be movable together, and a plurality of fixed contacts, said movable contacts being adjustable selectively to connect at least one pair of said probes in series with certain of said fixed contacts and to connect others of said pairs of probes in parallel with others of said fixed contacts, thereby to adjust the machine for indicating the correct and incorrect answers, respectively, to the question,
   (d) electric circuit means connecting said fixed contacts to said indicating device and operative when an answer paper is arranged in position in the machine and a conductive area thereon is disposed in electrically conductive registry with said one pair of said probes to effect operation of said indicating device in a first manner, and operative when a conductive area is disposed in electrically-conductive registry with one of said other pair of probes to effect a different operation of said indicating device, whereby a correct as well as a wrong answer to a question may be indicated,
   (e) said indicating device comprising a lamp, and means for maintaining said lamp normally illuminated, and
   (f) said electric circuit means in its two manners of operation comprising means for turning off said lamp, and for increasing its brilliancy, respectively.

2. Apparatus for grading test answer papers of the type wherein answer selections are made by marking predetermined areas of the papers with an electrically conductive material, said apparatus comprising, for each question to be answered on the paper:

(a) an electric lamp,
   (b) a plurality of probes arranged in pairs for contacting the respective predetermined areas of an answer paper when the answer paper is disposed in predetermined relation to said probes, and
   (c) circuit means connected between said lamp and said probes, said circuit means including
   (d) a first resistor, and means for connecting said lamp in series with said resistor across a source of electric current, (e) means connecting one probe of each pair to the junction between said lamp and said resistor, (f) a two pole-multiposition switch having as many different positions as there are pairs of said probes, (g) the fixed contacts of one pole of said switch being connected to the respective corresponding fixed contacts of the other pole and to separate ones of said probes opposite from the probes that are connected to said lamp, (h) the first movable contact of said switch being arranged to engage only one fixed contact for each position of said switch, (i) the second movable contact of said switch being arranged for engaging all of its fixed contacts except the one corresponding to the contact engaged by said first movable contact, (j) a second resistor connected between said first movable contact and the opposite side of said lamp from said first resistor, and (k) a third resistor connected between said second movable contact and the opposite side of said first resistor from said lamp.

3. Apparatus for grading test answer papers of the type wherein answer selections are made by marking predetermined areas of the papers with an electrically conductive material, said apparatus comprising, for each question to be answered on the paper:

(a) an electric lamp, (b) a plurality of probes arranged in pairs for contacting the respective predetermined areas of an answer paper when the answer paper is disposed in predetermined relation to said probes, and (c) circuit means connected between said lamp and said probes, said circuit means including (d) a first resistor, and means for connecting said lamp in series with said resistor across a source of electric current, (e) means connecting one probe of each pair to the junction between said lamp and said resistor, (f) a two pole-multiposition switch having as many different positions as there are pairs of said probes, (g) the fixed contacts of one pole of said switch being connected to the respective corresponding fixed contacts of the other pole and to separate ones of said probes opposite from the probes that are connected to said lamp, (h) the first movable contact of said switch being arranged to engage only one fixed contact for each position of said switch, (i) the second movable contact of said switch being arranged for engaging all of its fixed contacts except the one corresponding to the contact engaged by said first movable contact, (j) a second resistor connected between said first movable contact and the opposite side of said lamp from said first resistor, and (k) a third resistor connected between said second movable contact and the opposite side of said first resistor from said lamp, (l) said resistors being selected in value so that when an electrical connection is made between a pair of said probes, one of which is connected to a fixed contact engaged by said first movable contact, said lamp is effectively shorted out and extinguished, and when an electrical connection is made between any pair of said probes, one of which is connected to a fixed contact engaged by said second movable contact, said lamp is caused to glow at an above-normal brilliance.

4. Apparatus for grading test answer papers of the type wherein answer selections are made by marking predetermined areas of the papers with an electrically conductive material, said apparatus comprising, for each question to be answered on the paper:

(a) a pair of electrical indicators, (b) a plurality of electrical probes arranged in pairs for contacting the respective predetermined areas of an answer paper when the answer paper is disposed in predetermined relation to said probes, and (c) circuit means connected between said probes and said indicators for (d) actuating one of said indicators in response to the presence of predetermined answer selections on the answer paper, and (e) actuating the other indicator in response to the presence of any other answer selections, (f) said circuit means including a plurality of three pole-double throw switches connected in series with each other and with said probe pairs across one of said indicators, and in parallel with each other and in series with the other one of said indicators, (g) said one indicator being connected in series with a limiting resistor across the power input terminals of the apparatus, (h) said probe pairs being connected respectively between movable contacts of said switches so that actuation of said switches changes said probe pairs selectively between the circuit in parallel with said one indicator and the circuit in series with said other indicator, whereby a shorting circuit is closed around said one indicator when all of the predetermined answer selections are marked on the answer paper, and an energizing circuit is completed for said other indicator when any other answer selection is marked on the answer paper.

References Cited in the file of this patent

UNITED STATES PATENTS

| | | |
|---|---|---|
| 1,997,178 | Johnson | Apr. 9, 1935 |
| 2,113,620 | Johnson | Apr. 12, 1938 |
| 2,353,061 | Oldenboom | July 4, 1944 |
| 2,598,155 | Betts | May 27, 1952 |
| 2,964,374 | Miller | Dec. 13, 1960 |
| 2,970,386 | Knutson | Feb. 7, 1961 |